United States Patent
Chen et al.

(10) Patent No.: US 7,822,840 B2
(45) Date of Patent: Oct. 26, 2010

(54) METHOD AND APPARATUS FOR DYNAMIC WEB SERVICE CLIENT APPLICATION UPDATE

(75) Inventors: Ying Chen, Beijing (CN); Ru Fang, Beijing (CN); Liana Liyow Fong, Irvington, NY (US); David C. Frank, Ossining, NY (US); Linh Hue Lam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 11/877,479

(22) Filed: Oct. 23, 2007

(65) Prior Publication Data

US 2009/0106350 A1    Apr. 23, 2009

(51) Int. Cl.
    G06F 15/173    (2006.01)
(52) U.S. Cl. .................... 709/223; 709/203; 709/219
(58) Field of Classification Search ............... 709/223, 709/224, 203, 217, 219
    See application file for complete search history.

(56) References Cited

U.S. PATENT DOCUMENTS

| | | | | |
|---|---|---|---|---|
| 6,073,113 A * | 6/2000 | Guinan | ............ | 705/26 |
| 6,801,604 B2 | 10/2004 | Maes | | |
| 7,380,003 B1 * | 5/2008 | Guo et al. | ............ | 709/226 |
| 7,702,749 B2 * | 4/2010 | Meredith et al. | ............ | 709/219 |
| 2003/0033369 A1 * | 2/2003 | Bernhard | ............ | 709/203 |
| 2003/0055868 A1 * | 3/2003 | Fletcher et al. | ............ | 709/201 |
| 2004/0064503 A1 * | 4/2004 | Karakashian et al. | ........ | 709/203 |
| 2005/0050228 A1 * | 3/2005 | Perham et al. | ............ | 709/246 |
| 2005/0144591 A1 | 6/2005 | Banks | | |
| 2006/0122958 A1 | 6/2006 | Beisiegel | | |
| 2007/0067437 A1 * | 3/2007 | Sindambiwe | ............ | 709/224 |
| 2007/0124475 A1 * | 5/2007 | Syed et al. | ............ | 709/226 |
| 2007/0150546 A1 * | 6/2007 | Karakashian et al. | ........ | 709/207 |
| 2007/0157096 A1 * | 7/2007 | Keren et al. | ............ | 715/760 |
| 2008/0082660 A1 * | 4/2008 | Bachmann et al. | .......... | 709/224 |
| 2008/0270409 A1 * | 10/2008 | Naito et al. | ............ | 707/10 |
| 2009/0193132 A1 * | 7/2009 | Plewnia | ............ | 709/230 |

OTHER PUBLICATIONS

Vijay K. Naik, Swaminathan Sivasubramanian, and Sriram Krishnan, "Adaptive Resource Sharing in a Web Services Environment," Middleware 2004, LNCS 3231, pp. 311-330, 2004.

(Continued)

*Primary Examiner*—Lashonda T Jacobs
(74) *Attorney, Agent, or Firm*—Michael J. Buchenhorner; Derek S. Jennings (57) ABSTRACT

A method for managing a web service client update without recompiling or redeploying of the client code includes the following steps or acts of: receiving a request for the web service from a subscribed client; transmitting the request to the web service; receiving notification of the web service update from a service provider or registry or some other means; parsing the notification and retrieving parameters describing the web service update; marshalling the parameters; determining whether the new web service update is compatible with the current web service invoked by the client application; updating the local service proxy instance with the marshaled parameters if the new web service update is compatible with the current web service invoked by the client application; and transmitting a notification if the web service update is not compatible with the current web service invoked by the client application.

19 Claims, 9 Drawing Sheets

OTHER PUBLICATIONS

Piotr Kaminski, Hausi Muller, Marin Litoiu, "A Design for Adaptive Web Service Evolution," SEAMS'06, May 21-22, 2006, Shanghai, China.

G. Denaro, M. Pezze, D. Tosi, Daniela Schilling, "Towards Self-Adaptive Service-Oriented Architectures," TAVWEB' 06, Jul. 17, 2006, Portland, Maine, USA.

Jarogniew Rykowski, Wojciech Cellary, "Virtual Web Services—Application of Software Agents to Personalization of Web Services," ICEC'04, Sixth International Conference on Electronic Commerce Edited by: Marijn Janssen, Henk G. Sol, and René W. Wagenaar, Copyright 2004.

Piotr Kaminski, Marin Litoiu, and Hausi Muller, "A Design Technique for Evolving Web Services," Copyright © 2006 Piotr Kaminski, Hausi Müller, and IBM Canada Ltd.

Akmal B. Chaudri, Mario Jeckle, Erhard Rahm, and Rainer Unland, "Web, Web Services, and Database Systems," NODe 2002—Germany, Oct. 7-10, 2002.

* cited by examiner

FIG. 1

| Type of Change | Change detail | Comment | Backward Compatible? |
|---|---|---|---|
| ImplementationChange | Non-breaking change | Bug fix | Yes |
| | Breaking change | Different side-effect | No |
| InterfaceChange | Add operation | Existing consumers continue invoke existing operations while new operations become available for new consumers | Yes |
| | Remove/Rename operation | Remove or rename existing operations used by consumers | No |
| | Add Parameter | Add one or more parameters to existing operations used by consumers | Yes/No |
| | Remove/Rename Parameter | Remove or rename one or more parameters in existing operations used by consumers | No |
| | Parameter change | Parameter format change | No |
| Binding Change | Add protocol | Add a new implementation to support more protocols | Yes |
| | Change protocol | Change the binding protocol | No |
| | Endpoint change | Migrate the service to a new application server | No |

METHOD AND APPARATUS FOR DYNAMIC WEB SERVICE CLIENT APPLICATION UPDATE

CROSS-REFERENCE TO RELATED APPLICATIONS

This application contains subject matter similar to that found in commonly-owned U.S. patent application Ser. No. 11/774,162, filed on Jul. 6, 2007, entitled "Method and Approach to Hosting Versioned Web Services."

STATEMENT REGARDING FEDERALLY SPONSORED-RESEARCH OR DEVELOPMENT

None.

INCORPORATION BY REFERENCE OF MATERIAL SUBMITTED ON A COMPACT DISC

Not Applicable.

FIELD OF THE INVENTION

The invention disclosed broadly relates to the field of web services and more particularly relates to the field of web service client updates.

BACKGROUND OF THE INVENTION

An increasing number of enterprises demonstrate that a successful adoption of Service Oriented Architecture (SOA) using Web services technologies enables them to develop and integrate applications or solutions quickly and effectively. Compared with conventional techniques, including monolithic system and tightly-coupled client design, Web services provide a new approach for building applications in a loosely coupled, platform independent and standardized manner. Though evolutional, Web services do not escape the necessity of the software lifecycle and one of its most challenging aspects: change management.

In real-world scenarios, Web services always need to change after the original development or deployment to align with changing business requirements. In the total lifecycle of Web services, services can be updated at every stage of the lifecycle. For example, the adding or removing of operations from the interface at design time, bug fixing or adapting another programming language at build-time, changing the deployment server at deployment time, and updating the security policy at runtime. For these changes, a critical issue is to specify the changes and understand their impact to the client. Generally speaking, the impact can be described in terms of compatibility.

A change of a service is termed compatible if no potential client is affected, for example a bug fix. A change is termed as incompatible if there is at least one potential client who would fail when invoking the service after the change, for instance a mandatory parameter is added to the operation in use. In real world scenarios, a web service is like a black-box, so it is hard for the consumers or a third party to specify the compatibility between two versions. Ideally, the service developers would need to address the compatibility of the service changes using some kind of assistant tools and making the compatibility classification task as part of their service development.

The evolution of services often necessitates the co-existence of multiple versions of the same original service. In the SOA model service providers and consumers have independent development and deployment cycles. It is unreasonable to assume that every time a service changes, all of its consumers will rapidly adopt the change by rebuilding and redeploying all their applications. However, if client applications fail to keep track of service changes, businesses supported by the client applications will be inevitably interrupted and suffer undesirable consequences.

While change management is an important aspect in all software development processes, its complexity is increased for Web services due to their loosely coupled nature. A prominent consideration is the impact of the changes in a remote service to a local client application. Consider a case where the public interface of a service remains the same; replacing old versions of the service with new versions would be transparent to the consumers. However, adding a mandatory input parameter to an existing operation, for example, would create a difficult task for the underlying platform because the old version cannot simply be retired; otherwise any consumer depending on that version would be disrupted.

Today service providers use notification messages, such as a release note or an application programming interface (API) upgrade guide, to notify and to help the service developer to update its client applications. The release note or API upgrade guide describes the differences between the new services and the old services, and it is sent out from some service registry, for example a Universal Description, Discovery, and Integration (UDDI) registry, or service provider by emails, forum, discussion community or blogs. When the service developer reads the whole release note or API upgrade guide document then they can determine whether they need to change their client application code.

However, if the release note or API upgrade guide is long or complex or the size of the client application code is huge, it can be very difficult for the developer to locate the part of the code needing adjustment.

SUMMARY OF THE INVENTION

Briefly, according to an embodiment of the invention a method for managing a web service client update includes steps or acts of: receiving a request for the web service from a client; transmitting the request to the web service; receiving notification of the web service update from a service provider or registry or some other means; parsing the notification and retrieving parameters describing the web service update; marshalling the parameters; determining whether the new web service update is compatible with the current web service invoked by the client application; updating the local service proxy instance with the marshaled parameters if the new web service update is compatible with the current web service invoked by the client application; and transmitting a notification if the web service update is not compatible with the current web service invoked by the client application.

The method can also be implemented as machine executable instructions executed by a programmable information processing system or as hard coded logic in a specialized computing apparatus such as an application-specific integrated circuit (ASIC).

BRIEF DESCRIPTION OF THE DRAWINGS

To describe the foregoing and other exemplary purposes, aspects, and advantages, we use the following detailed description of an exemplary embodiment of the invention with reference to the drawings, in which.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a method and apparatus for maintaining the runtime environment of Web service client application updates. According to a method embodiment of the present invention, the following functions are implemented to manage Web service changes:

a) allowing the service client application to receive change notifications when changes occur on the target service;

b) in the case of a web service client application invoking the target service through a local proxy, the proxy has all the information of the target Web services. If these changes are backward compatible with the old version, the proxy instance is dynamically updated at runtime to adapt to backward compatible changes; and c) if these changes are not compatible with the previous version, a notification message is generated and sent to the appropriate service consumer (either the end user or system administrator), to notify them of the incompatibility and the need for updating and redeploying the client service application.

The method as described herein is predicated on the following premise. If service consumers can subscribe to the services they use on the side service registry and/or service providers are notified about the changes and adapt to them if necessary, then the remote service changes can minimize their impact on the consumers. Further, if a new service is backward compatible with the old service, or if the function used by the consumer has not changed in the new service, then this new release of the service should be transparent to the service consumers.

It is an object and advantage of the present invention that the Web service client application does not need to be re-built and re-deployed for every backward compatible target service change. It is a further object and advantage of the invention that the developers of the Web service client applications receive notifications in advance for in-compatible target service changes. Further, the history of target service changes can be tracked and stored locally.

With the service provider's description about the compatible changes of different versions of a service on the related service attributes, the method according to an embodiment of the invention can determine the types of compatibility changes based on this description. The compatible changes to consider here are: 1) fixing bugs; 2) adding or renaming the operations; 3) adding optional parameters or renaming parameters; 4) changing the endpoint address of the target service; and 5) adding a communication protocol.

The details of the compatibility definition, and the structure and process of this invention are described in the discussion to follow.

Figure 1:
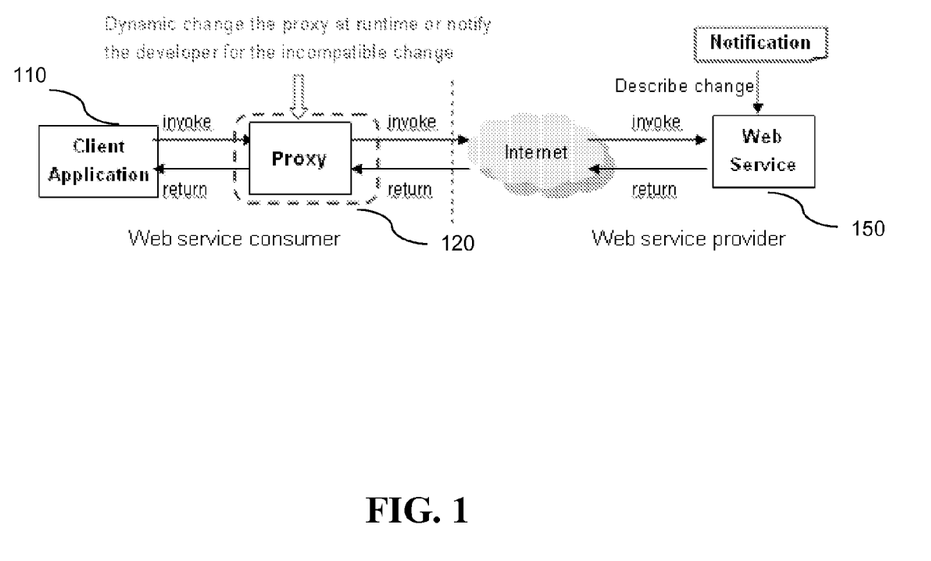
FIG. 1 is a pictorial representation of how a current Web service invocation process is integrated with an embodiment of the present invention.

Referring now in specific detail to the drawings, and particularly FIG. 1, there is illustrated a pictorial representation of how a method according to the present invention is integrated with a currently running Web service invocation process. The proxy 120 (shown in the dot-line box) is updated at runtime. As illustrated in FIG. 1, in the standard Web service invocation process, a Web service client application 110 should never access the target Web service 150 directly. Instead, it should invoke the target Web service 150 through a service proxy 120, which is a representation of an instance of the Web service 150. The proxy 120 has all the service signature definition and configuration features from the Web Service Description Language (WSDL) file, for example the operation name, message format and the accessing endpoint address.

Currently this proxy 120 can be created with the help of some auto-generation toolkits, but it cannot be changed after deploying the Web service client application 110. So if any changes occur on the target service 150, the developer needs to create a new proxy, then re-build and re-deploy the client application 110. The present invention addresses this problem by providing an approach to update the proxy instance at runtime to avoid the re-build and re-deployment process of the client application 110 for backward compatible changes.

Figure 2:
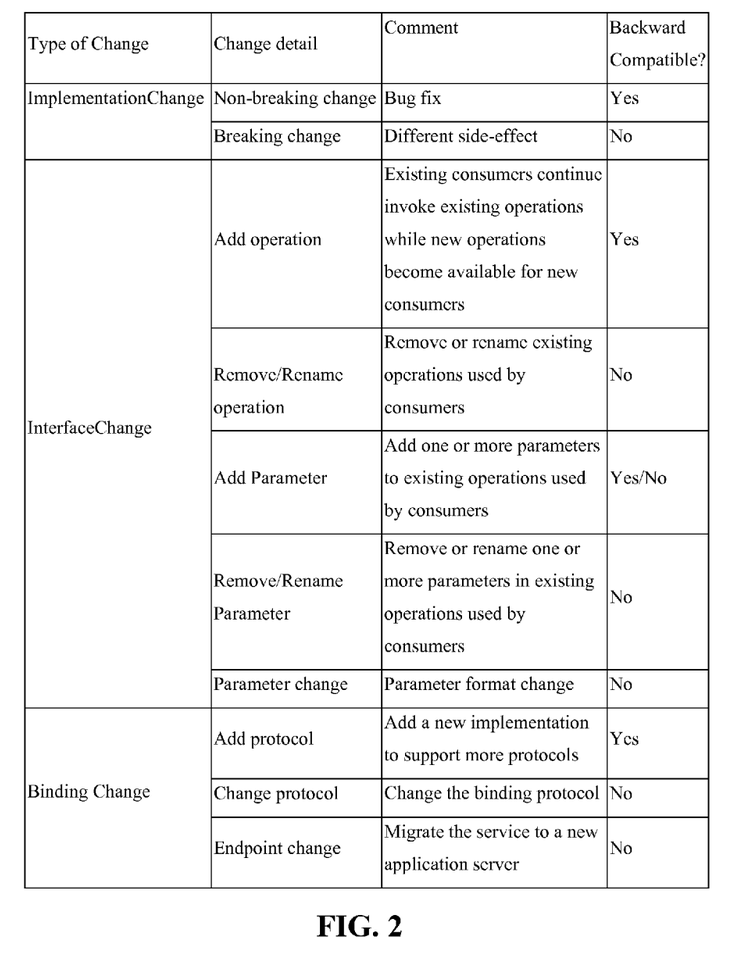
FIG. 2 is a table of detailed analysis of the Web service changes and their compatibility features.

For incompatible changes, notifications will alert the client environment (either the end user or system administrator) that the client developer must change the client application code. Referring now to the table in FIG. 2, it shows the detailed analysis of the types of Web service changes and their effects on the compatibility issues.

Figure 3:
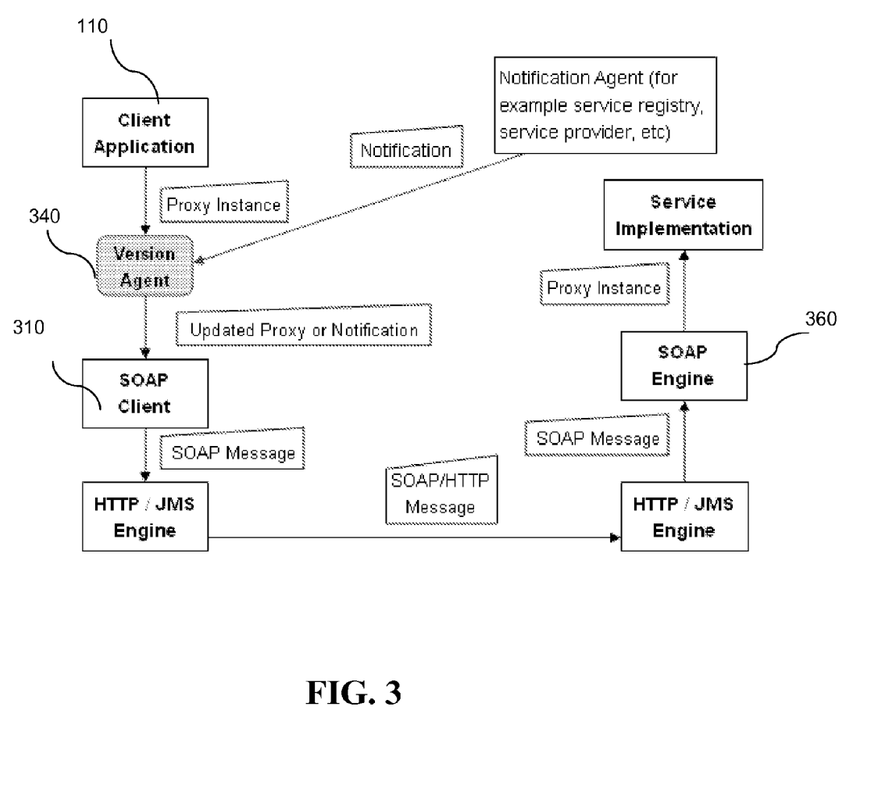
FIG. 3 is a simplified block diagram of the method as implemented in a current Web service invocation system.

Referring to FIG. 3, there is shown a block diagram of how the present invention can be implemented in a current Web service invocation system. The invocation process begins with the Web service client 110 generating a proxy stub that acts as a surrogate for the real Web service. Then a Simple Object Access Protocol (SOAP) client 310 marshals the parameters received from the proxy stub to a SOAP message. Finally the SOAP message is packaged into an HTTP or JMS message by the HTTP or JMS engine and serialized across the transport layer to the target service 150.

We add a component, Version Agent 340, between the Web service client application 110 and the SOAP engine 360. This component is used to update the information described in the proxy 120 at runtime or generate the notification for the appropriate service consumer (either the end user or system administrator) according to some notification message from the service provider or registry or some other means.

Figure 4:
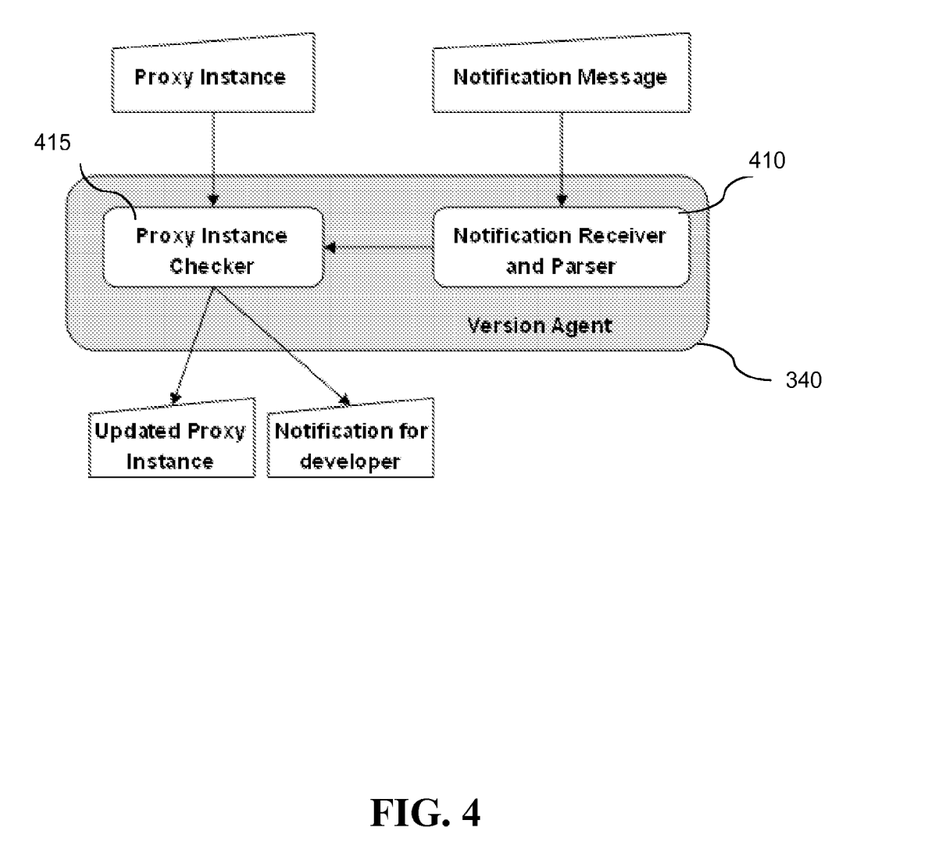
FIG. 4 is a simplified block diagram illustrating the components used in a Version Agent to provide proxy dynamic updating functions, according to an embodiment of the present invention.

FIG. 4 is a diagram illustrating an embodiment of the present invention—components used in the Version Agent 340 to provide dynamic proxy updating functions. Two components are designed for the Version Agent 340, Notification Receiver and Parser 410, and Proxy Instance Checker 415. The Notification Receiver and Parser 410 provide the functions of receiving and parsing the notification message from an outside source, such as a service registry or service provider.

The Proxy Instance Checker 415 is used to determine the compatibility of the new service and update the information in the proxy instance according to the notification message for any backward-compatible service changes, or it will generate the notification message for the appropriate service consumer (either the end user or system administrator) for any in-compatible service changes. A possible implementation and an example are shown in the following.

Figure 5:
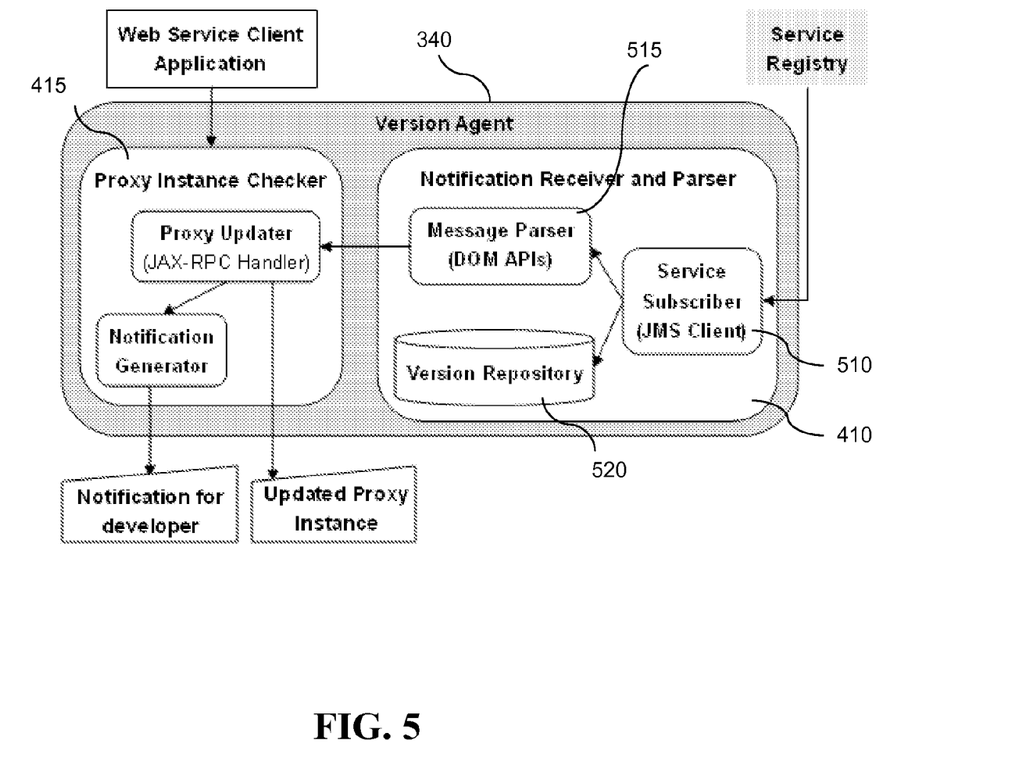
FIG. 5 is a diagram illustrating a possible implementation for the Version Agent, according to an embodiment of the present invention.

In FIG. 5, we give a possible implementation for the present invention. The Version Agent 340 is implemented by the Java™ programming language and resides in the IBM WebSphere® Application Server (WAS) runtime environment. The Notification Receiver and Parser 410 are implemented by three components, Service Subscriber 510, Message Parser 515 and Version Repository 520.

Service Subscriber 510 is used to subscribe the service in a service registry, for example a UDDI (Universal Description, Discovery and Integration) service registry, and get notification from the registry. The subscription/notification mechanism can be implemented by many techniques, for example the Java™ Messaging Service (JMS) framework and mailing list technique. If we select a WAS UDDI component as the service registry, then the JMS framework is a better selection to implement the subscription/notification mechanism, because the WAS UDDI component has already provided some JMS APIs which can be connected to by the client.

The Message Parser 515 is used to retrieve the content of the notification message. Currently most of the transportation messages are in the XML format. So Document Object Model (DOM) APIs or a Simple API for XML (SAX) can both be selected to parse the message and retrieve its content.

Version Repository 520 is used to store the information of the services subscribed locally. It actually contains a change history of the target service in a local repository. It can be implemented as a group of files, database, or some other mediums. To simplify the implementation process, we can just use flat files to store the service information locally. A repository accessing class provides the Create, Read, Update, and Delete (CRUD) functions to these files.

Figure 6:
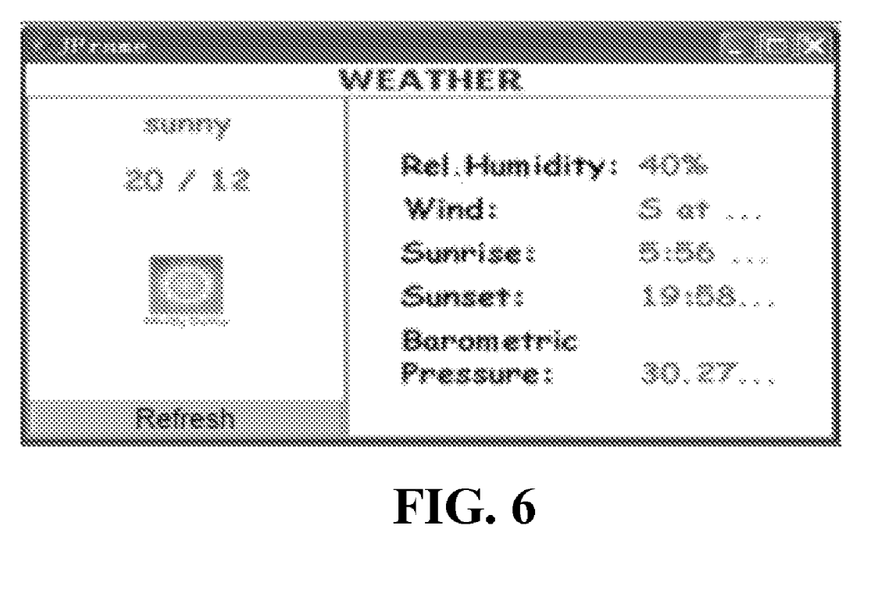
FIG. 6 is an example illustrating the usefulness of this invention for a backward compatible service change.

FIG. 6 is an example illustrating the usefulness of this invention for a backward compatible service change, using the example of the Weather Forecast Service (WFS). This is a simple Web service which provides weather forecast information. WFS Version 1 has only one operation getWeatherReport (String date, String city) and provides one-day weather forecast information for a selected city in the United States. Here we use the UDDI component in WAS V6 as the default service registry. The developers of the client application 110 have used the WAS JMS mechanism to subscribe the WFS service in the service registry. The WFS client application is implemented as a simple Java™ project and the simple pop-up message mechanism of Java™ language is used to implement notification for the developers.

Assuming WFS Version 1 is going to be retired, a new WFS Version 2.0 is now made available. Changes introduced by WFS Version 2.0 include a new endpoint address because it is now running on a new server, and a new argument "days" has been added to the original operation, getWeatherReport(String date, String city, int days), to provide several-days weather forecast information for any city in the United States. In order to remain backward-compatible, the default value of the new parameter "days" will be automatically set to "1" if the client doesn't specify the number of days in the request message.

For this update the service registry will publish a JMS notification message based on the subscription information. Upon receiving the notification message the Notification Receiver and Parser 410 will cache and parse the received message, and then publish the parsed message to the Proxy Instance Checker 415 which is integrated with each Web service client. The Proxy Instance Checker 415 will then use this notification message to reconfigure the service proxy at runtime (e.g. sets the value "1" to the third argument "days," and changes the endpoint address to the new one). Since this is a backward-compatible change, there is no necessity to issue a message pop-up box to the developers. The client application 110 can receive the response message without interruption, as shown in FIG. 6. The details of this new version of the WFS service can be seen in the Version Repository 520.

Figure 7:
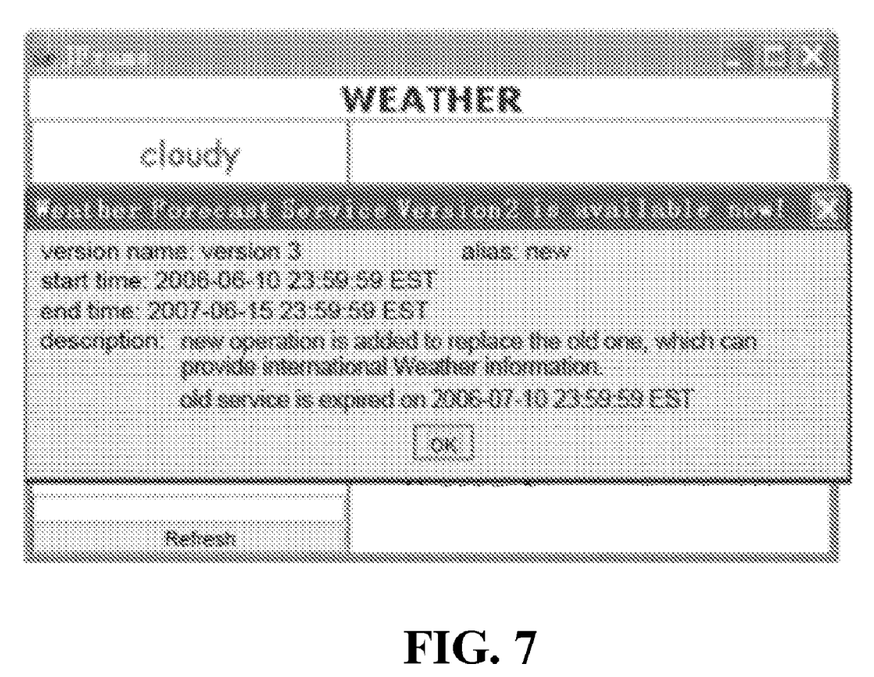
FIG. 7 is a diagram illustrating an example of the usefulness of this invention for the in-compatible service change.

Now let's assume a newer version of WFS has been published as WFS Version 3.0. The old operation will be changed to: getInternationalWeatherReport(String date, String country, String city) in order to provide a one-day weather forecast information for any city in the world. Because this is an in-compatible version, we prompt the developer with a message as shown in FIG. 7 to notify the developer about the incompatible portion and the new feature added to the target service. If the developer wants to try out this new feature, he can see the details in the Version Repository 520 and re-build the WFS Client application according to the information in the Version Repository 520.

Figure 8:
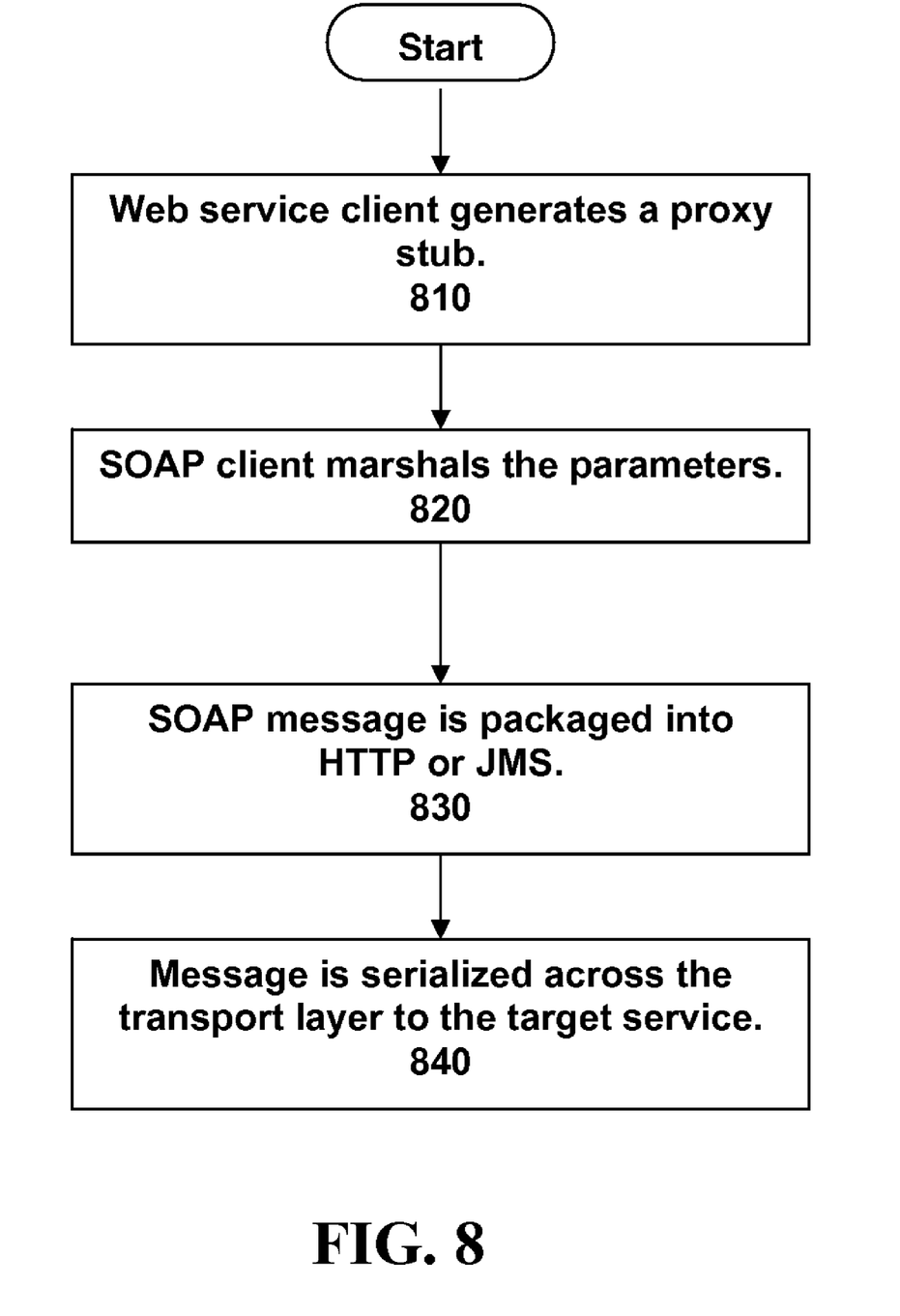
FIG. 8 is a flow chart of a method according to an embodiment of the present invention.

Referring to FIG. 8, there is shown a flow chart of the method as implemented in a current Web service invocation system. First, in step 810, the Web service client 110 generates a proxy stub 120 that acts as a surrogate for the real web service 150. In step 820 the SOAP client marshals the parameters received from the proxy stub to a SOAP message. Finally, in step 830 the SOAP message is packaged into HTTP or JMS. In step 840 the message is serialized across the transport layer to the target service.

Figure 9:
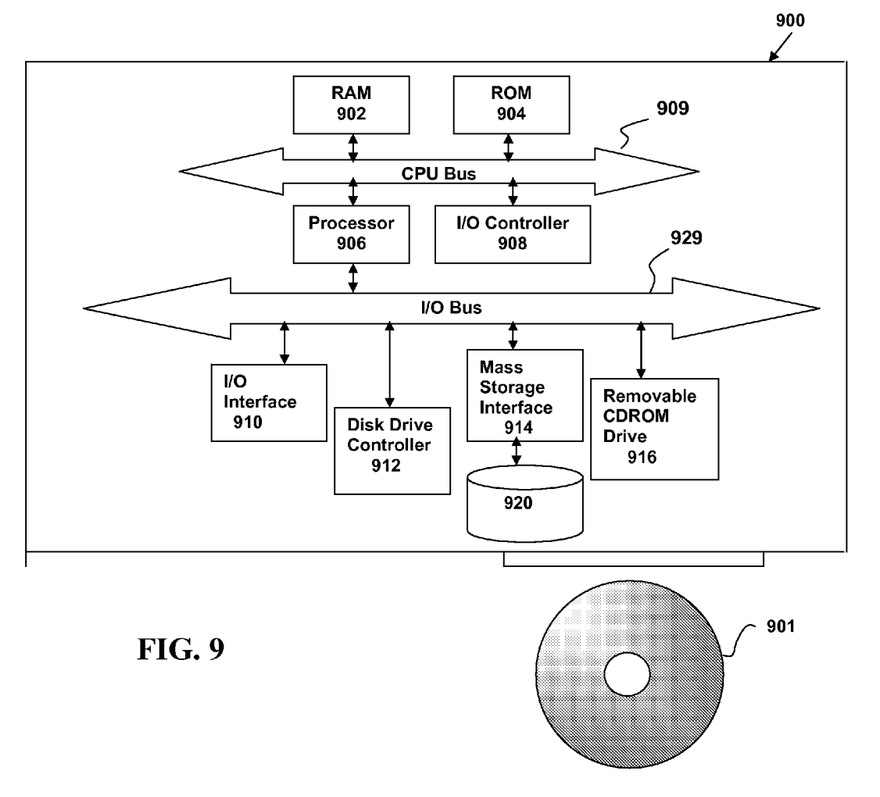
FIG. 9 is a simplified block diagram of a system configured to operate according to an embodiment of the present invention.

Referring to FIG. 9 there is shown a block diagram of an information handling system 900 consistent with an embodiment of the present invention. For purposes of this invention, computer system 900 may represent any type of computer, information processing system or other programmable electronic device, including a client computer, a server computer, a portable computer, an embedded controller, a personal digital assistant, and so on. The computer system 900 may be a stand-alone device or networked into a larger system.

The system 900 could include a number of operators and peripheral devices as shown, including: random access memory 902, read-only memory 904, a processor 906 and input/output controller 908. These are linked by a CPU bus 909. Additionally, there is an input/output bus 929, and input/output interface 910, a disk drive controller 912, a mass storage device 920, a mass storage interface 914, and a removable CDROM drive 916. The processor 906 may be a general or special purpose microprocessor operating under control of computer program instructions executed from a memory. The processor 906 may include a number of special purpose sub-processors, each sub-processor for executing particular portions of the computer program instructions. Each sub-processor may be a separate circuit able to operate substantially in parallel with the other sub-processors. Some or all of the sub-processors may be implemented as computer program processes (software) tangibly stored in a memory that performs their respective functions when executed. These may share an instruction processor, such as a general purpose integrated circuit microprocessor, or each sub-processor may have its own processor for executing instructions. Alternatively, some or all of the sub-processors may be implemented in an ASIC. RAM 902 may be embodied in one or more memory chips. The memory may be partitioned or otherwise mapped to reflect the boundaries of the various memory sub components.

The memory represents either a random-access memory or mass storage. It can be volatile or non-volatile. The system 900 can also comprise a magnetic media mass storage device such as a hard disk drive.

The I/O subsystem 908 may comprise various end user interfaces such as a display, a keyboard, and a mouse. The I/O subsystem 908 may further comprise a connection to a network such as a local-area network (LAN) or wide-area network (WAN) such as the Internet. Processor and memory components are physically interconnected using a conventional bus architecture.

Therefore, while there has been described what is presently considered to be the preferred embodiment, it will understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

The invention claimed is:

1. A method for managing a web service client update, the method comprising:
using a version agent device for:
receiving a request for the web service from a client;
transmitting the request to the web service;
receiving notification of the web service client update;
parsing the notification and retrieving parameters describing the web service update;
marshalling the parameters;
determining whether the web service client update is compatible with a current web service invoked by the client's application;
updating a local service proxy instance of the web service with the marshaled parameters at runtime if the web service client update is compatible with the current web service invoked by the client application; and
transmitting a notification to the client if the web service client update is not compatible with the current web service invoked by the client application.

2. The method of claim 1 wherein the parameters comprise configuration parameters and service signature definition parameters pertaining to the web service update.

3. The method of claim 2 further comprising setting a default value for any new parameter.

4. The method of claim 1 further comprising storing the parameters in a local repository.

5. The method of claim 4 further comprising locally storing a change history of changes in the parameters.

6. The method of claim 1 wherein the step of receiving notification comprises receiving notification of the web service update from a service provider.

7. The method of claim 1 further comprising an initial step of receiving a subscription of the client to the web service.

8. The method of claim 7 wherein the subscribing step comprises subscribing to a service directory or a service provider such that a client is notified when a change occurs to the web service registered in the service directory or hosted by the service provider.

9. An information processing system for managing a web service client application update, the system comprising:
a processor configured to:
receive a request for the web service from a client;
transmit the request to the web service;
a version agent disposed between the web service client application and the processor, said version agent configured to:
receive notification of the web service client application update from an outside source;
parse the notification;
retrieve parameters describing the web service client application update;
marshal the parameters;
determine whether the web service client application update is compatible with a current web service invoked by the client's application;
update a local service proxy instance of the web service with the marshaled parameters at runtime if the web service client application update is compatible with the current web service invoked by the client application; and
transmit a notification to the client if the web service update is not compatible with the current web service invoked by the client application.

10. The system of claim 9 wherein the version agent is a proxy server.

11. The system of claim 9 wherein the processor is a SOAP engine.

12. The system of claim 9 wherein the outside source is a service registry.

13. The system of claim 9 wherein the version agent is configured for updating information in the proxy instance according to the notification message for backward-compatible service changes.

14. The system of claim 13 wherein the version agent is configured for generating the notification message to the client for incompatible service changes.

15. The system of claim 9 wherein the web service client application is a Remote Method Invocation (RMI) service.

16. The system of claim 9 wherein the web service client application is a Common Object Request Broker Architecture (CORBA) service.

17. The system of claim 9 further comprising storage configured for storing multiple versions of the web service such that the web service client application binds to a particular version of the web service.

18. A computer program product embodied on a computer storage medium, the computer program product comprising program code instructions that, when executed, causes the computer program product to perform the following:
receive a request for the web service from a client;
transmit the request to the web service;
receive notification of a web service update;
parse the notification;
retrieve parameters describing the web service update;
marshal the parameters;
determine whether the web service update is compatible with a current web service invoked by the client's application;
update a local service proxy instance of the web service with the marshaled parameters at runtime if the web service update is compatible with the current web service invoked by the client application; and
transmit a notification to the client if the web service update is not compatible with the current web service invoked by the client application.

19. The computer program product of claim 18 embodied on an application specific integrated circuit.

* * * * *